United States Patent [19]

Weiler et al.

[11] Patent Number: 5,087,907
[45] Date of Patent: Feb. 11, 1992

[54] FRICTION LINING WARNING DEVICE

[75] Inventors: Rolf Weiler, Eppstein; Uwe Bach, Niedernhausen; Klaus-Dieter Paschke, Frankfurt am Main; Gerald Roth, Hanau, all of Fed. Rep. of Germany

[73] Assignee: Alfred Teves GmbH, Frankfurt am Main, Fed. Rep. of Germany

[21] Appl. No.: 471,143

[22] Filed: Jan. 26, 1990

[30] Foreign Application Priority Data

Feb. 4, 1989 [DE] Fed. Rep. of Germany ....... 3903306

[51] Int. Cl.$^5$ .............................................. B60Q 1/00
[52] U.S. Cl. .................................... 340/454; 188/1.11; 200/61.4
[58] Field of Search ................... 340/454; 188/1.11; 200/61.4, 61.44

[56] References Cited

U.S. PATENT DOCUMENTS 3,808,593  4/1974  Kopernik et al. ............... 340/454
4,280,594  7/1981  Baum .......................... 340/454 X Primary Examiner—Jin F. Ng
Assistant Examiner—Jeffery A. Hofsass
Attorney, Agent, or Firm—Robert P. Seitter; J. Gordon Lewis

[57] ABSTRACT

A friction lining warning device for a pin-guided spot-type disc brake whose caliper housing, brake carrier is slidingly arranged at a pin. A stud which engages an opening of the pin and is arranged in alignment with the pin. A switch housing surrounds the pin and is connected to the caliper housing, to the brake carrier, the pin and the stud and is movable relative to the switch housing and to the caliper housing. Electric switches in the stud, in the switch housing release when the stud has travelled a predetermined distance relative to the switch housing. The switch housing and the stud can be brought in abutment with each other to provide a basic adjustment. The switch housing is connectable to the caliper housing, brake carrier within a range of tolerance after the basic adjustment has been assumed. The stud (19, 61, 62, 91, 101, 102, 121, 141, 190, 201) is provided with a stop (29, 105) which abuts against the pin (4) in the axial direction.

21 Claims, 9 Drawing Sheets

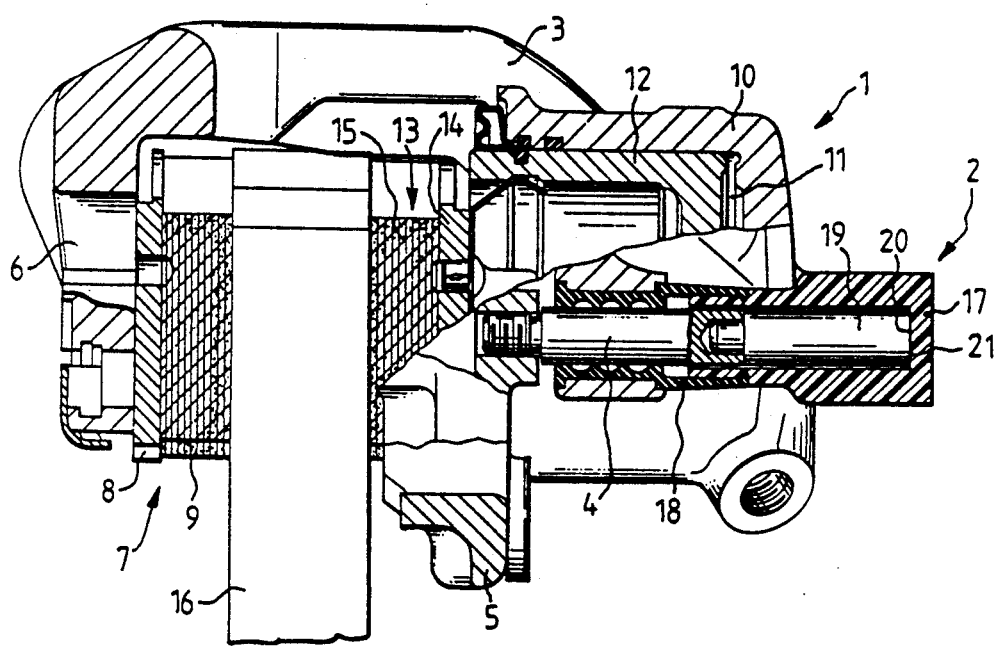
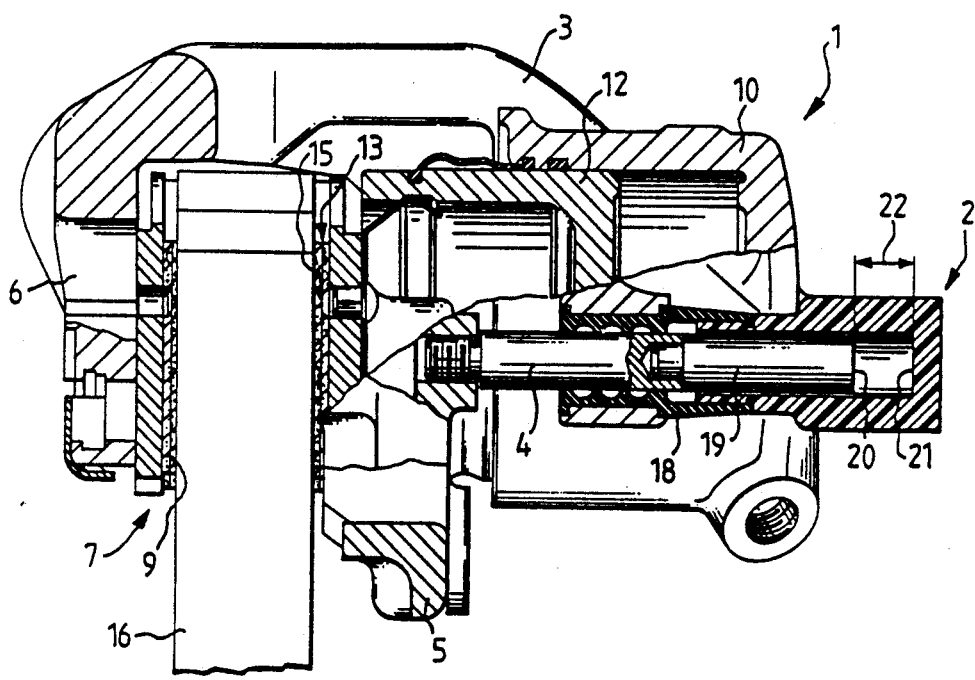

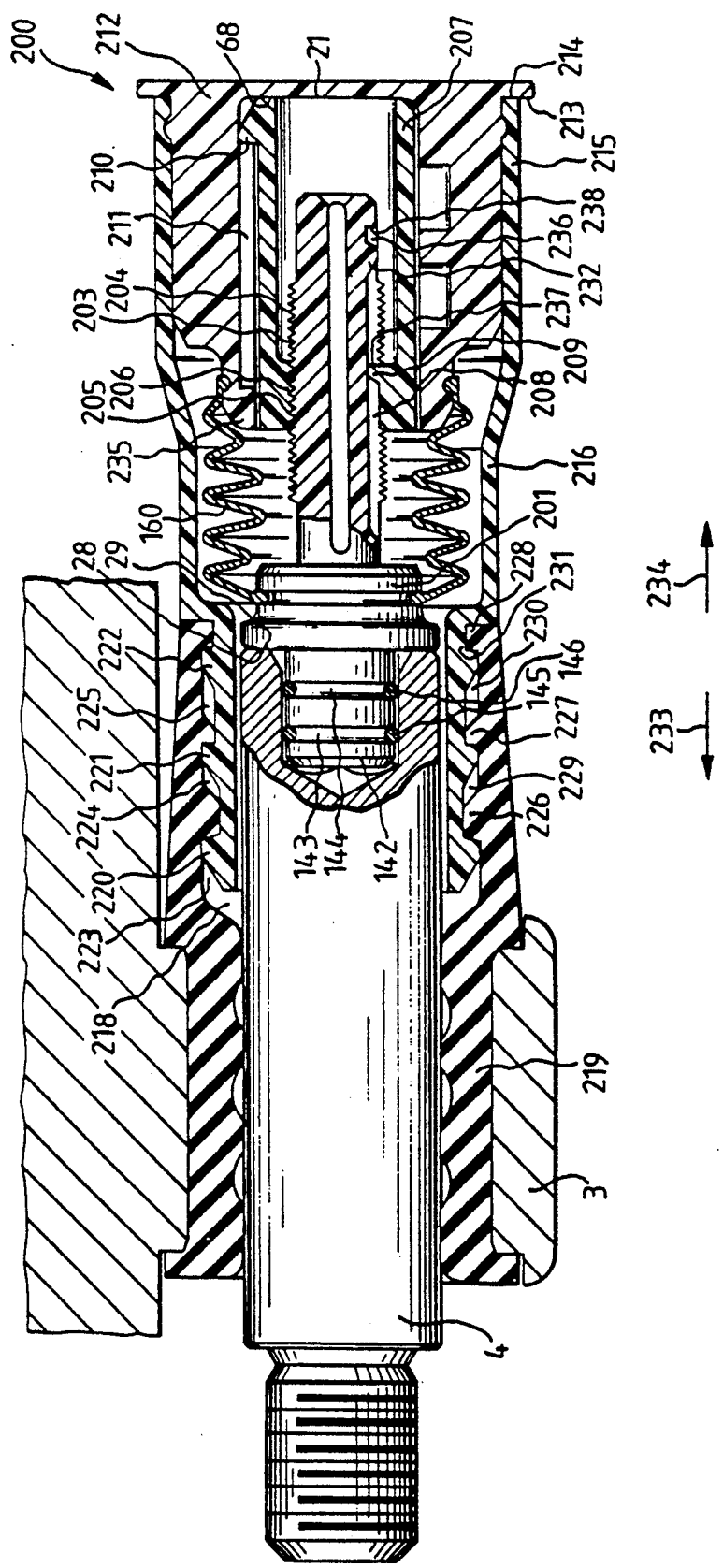

FRICTION LINING WARNING DEVICE

BACKGROUND OF THE INVENTION

This invention relates to a friction lining warning device for a pin-guided spot-type disc brake in which electrical switches are responsive to movement of a stud which engages the pin.

German patent application No. 29 29 039 discloses a friction lining warning device which is arranged between an end section of a brake carrier and a pin and is connected to the pin. The friction lining warning device has a housing forming a second component which is fastened to an end section of the brake carrier, and a rod-shaped sensor forming a first component fixed to the pin in a friction-type locking fit by means of a lock washer. A stop element is positioned within the housing against which the end of the sensor is abutted in order to limit the motion of the sensor into the housing. When fastening the friction lining warning device in the brake carrier, particularly in the pin, difficulties are encountered, especially when fixing the sensor in the pin. This is because the depth of penetration of the sensor in the pin defines a position of the housing relative to the sensor and the depth of penetration cannot be controlled. The indication of the wear of the lining depends on the relative position between the sensor and the pin. In the event of an incorrect mounting, the device fails to indicate correctly or the friction lining warning device becomes detached from the disc brake.

It is the object of the invention to improve a wear-resistant, reusable friction lining warning device and to improve the indication of the wear of the lining warning device and to improve the indication of the wear of the lining. The fixing is to be safe and reliable. In particular, a plurality of warning points indicating different thicknesses of the friction lining to a driver or to a workshop are to be positioned in the warning device.

SUMMARY OF THE INVENTION

This object is achieved in accordance with the present invention wherein a first position of rest of the stud relative to the pin is defined by the axial abutment of the stud with the pin. In this manner, a basic adjustment is established upon which a second adjustment, that is, a tolerance balancing adjustment between the switch housing, the caliper housing and the pin, which the stud provides. It is, thus, ensured that starting from the basic adjustment in the event of a wear of the brake lining an exact distance is covered by the travel of the stud relative to the switch housing which in case of a wear of the brake lining perform a relative movement in respect of each other. In response to this distance of travel, electrically actuatable switches which are arranged over the path are actuated one after the other.

In one embodiment of the present invention, the stud has a cylindrical shape and presents a diameter which is smaller than the internal diameter of the hexagonal recess of the pin, so that the front surface of the stud is introduced into a hexagonal recess of the pin and permits abutment against the bottom of the hexagonal recess. In this manner, the stud presents a simple manufacturing design.

In a further embodiment of the present invention, the stud is furnished with an annular peripheral projection with a surface directed in radial direction which abuts against the front face of the pin in the shape of stop. According to this design, the stud is in abutment against the pin, with the result that a fixation between the friction lining warning device and the spot-type disc brake is safeguarded because a fixing device is firmly clamped between the stud and the pin.

In an advantageous embodiment of the present invention the bottom surface of the switch housing is abutted against the second front surface of the stud, with the result that the basic adjustment is established between the stud and the switch housing, respectively between the pin and the caliper housing, when the brake linings are new. Advantageously, the switch housing is positioned at the damping bushing which surrounds the pin in a shell-type manner and is arranged in a bore of the housing, between the pin and the housing. In this configuration, the switch housing is utilized as an integrating component of the damping bushing.

In another embodiment of the present invention, the switch housing is furnished with a thread which is screwed onto the damping bushing. As a counterpart, the damping bushing is provided with a threaded insert which is preferably made of metal or of plastic and which is screwable onto the switch housing. During screwing-on, the individual mounting points, such as, for example, the abutment of the stud against the pin (basic adjustment) and afterward the abutment of the switch housing against the stud (balance of tolerance), provide control on the basis of the applied torque. With the aid of axially disposed grooves and axially disposed projections of a protective bushing which engage counterparts of the threaded insert and of the switch housing which present a matching configuration, the switch housing is advantageously secured against rotation and against unintentional detachment.

In a further development of the present invention, the switch housing presents projections having a notch-type configuration and are arranged circumferentially in a ring-shaped manner which engage grooves of a matching configuration which are provided in an axially directed extension of the damping bushing. With the aid of the notch-type projections engaging the grooves, tolerances between the caliper housing, respectively the brake carrier, on one side, and the pin, on the other side, are balanced in an advantageous manner.

In an advantageous development of the present invention, the switch housing is provided with a sensor housing with hooks. The hooks are undetachable caught behind second hooks of a damping bushing which present a matching configuration. In this manner, a firm seating of the friction lining warning device at the damping bushing is ensured.

In one advantageous embodiment of the present invention a bushing slidable relative to the stud is arranged on the stud. The tolerance between the stud and the bushing of the stud is balanced upon mounting of the friction lining warning device and the spot-type disc brake. During this procedure it is appropriate to secure the warning device against an unintentional displacement of the switch housing because the switch housing is positioned so as to abut in axial direction against the damping bushing. In this context, the bushing may, according to a preferred embodiment, be clamped on the stud in a friction-type locking fit. In a further embodiment of the invention, notches are provided both on the stud and on the internal generated surface of the bushing, so that the bushing and the stud may be hooked with each other at these notches. By providing an axially extending groove and an axially extending projection, a twisting motion of the stud in respect of the bushing advantageously is precluded as a precautionary measure. A nose directed radially internally and disposed at the bushing, and a nose directed radially externally and disposed at the stud, advantageously provide that simultaneously with the bushing also the stud can be extracted out of the pin in the event of unmounting of the spot-type disc brake and of the friction lining. In that event, an assembly position is defined between the stud and the bushing.

In an advantageous embodiment of the present invention, the stud presents an outside diameter which is smaller than the inside diameter of the hexagonal recess of the pin. In this manner, the stud is smoothly inserted in the hexagonal recess. A spring keeps the stud abutted against the pin.

In another advantageous embodiment of the present invention, the pin is provided with a spring plate as a fixing means which clamps the stud within the hexagonal recess of the pin. In still another advantageous embodiment of the present invention, the stud is furnished with lock washers which retain the stud within the hexagonal recess of the pin.

In still another embodiment of the present invention, the stud is provided with a shim which is retained at the stud by a rivet and is clampable in the pin. In this configuration, it is ensured in an advantageous manner with the aid of the axial abutment of the stud with the pin that even for an axially short-design hexagonal recess fixing means, such as a spring plate, lock washers or shims are applied and detachably clamp, lock or engage the pin, and safely perform their function. In order to prevent soiling of the friction lining warning device, a cup is fixed at the stud and at the bushing which protects the electrical parts of the friction lining warning device. Protection also is provided for the friction lining warning device. This friction lining warning device is provided, in particular, for a spot-type disc brake and is furnished with a stud having a front surface and a bushing having a bottom surface which abuts against each other upon assembly.

If and when a plurality of switches is positioned between the switch housing and the stud and when the predetermined distances of travel approach zero, that is, when the predetermined distances of travel or the distances between the switches become infinitely small, then an infinite, continuous indication of the wear of the linings, for example, of the type of a potentiometer, therefore, is possible and advantageous.

BRIEF DESCRIPTION OF THE DRAWING

In the following detailed description, the invention will be described in greater detail with reference to the embodiments shown in the accompanying drawing, in which:

FIG. 1 illustrates a spot-type disc brake with new brake linings;

FIG. 2 illustrates a spot-type disc brake with worn brake linings;

FIG. 11 shows a seventh friction lining warning device with a stud divided into two parts and with a protective cup; and, FIG. 12 shows the friction lining warning device of FIG. 11 in a cross-sectional view.

DETAILED DESCRIPTION

Figure 3:
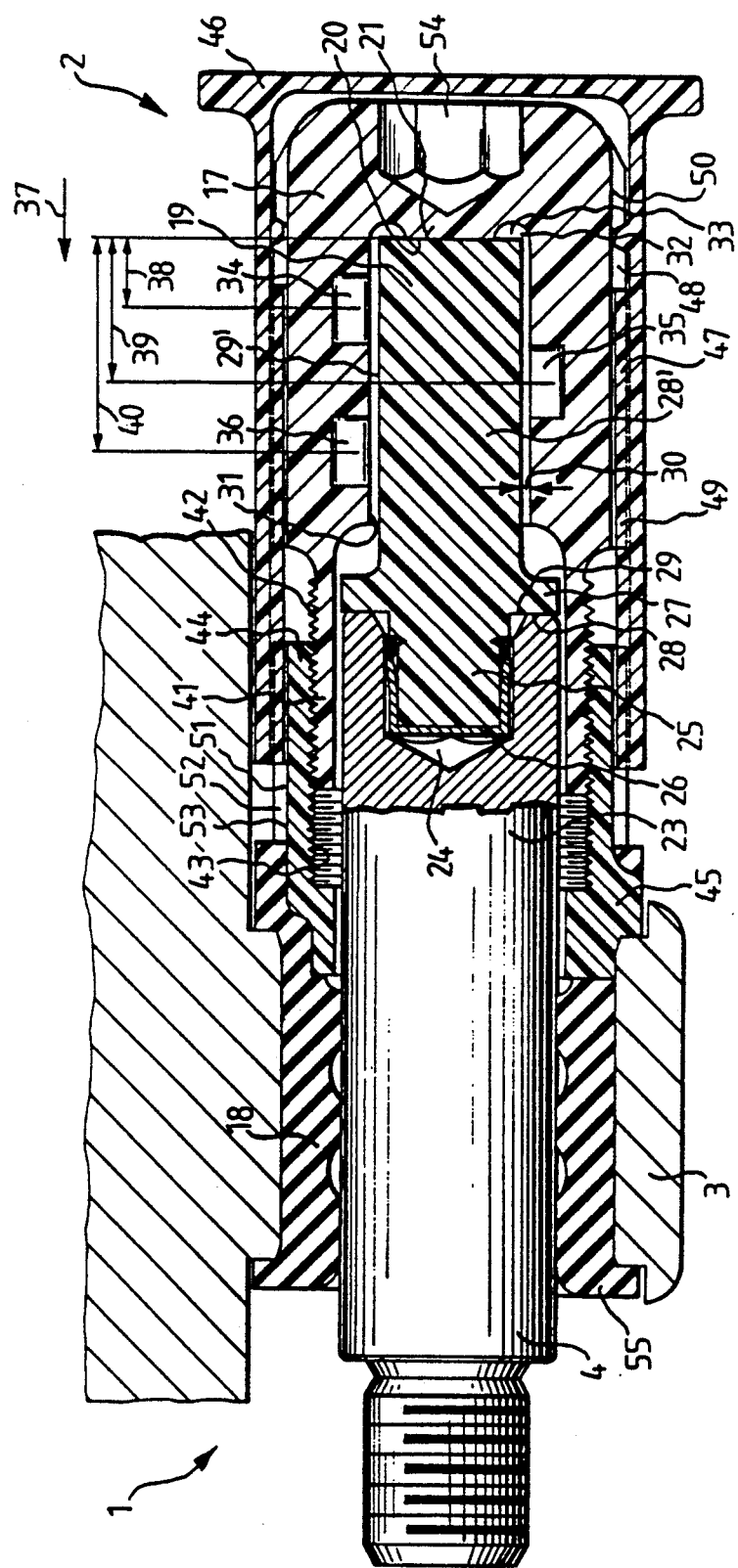
FIG. 3 shows a friction lining warning device in accordance with the present invention whose switch housing is firmly screwed to a threaded insert of the damping bushing and is secured by means of a protective bushing.

In the following detailed description, like elements bear like reference numerals for reasons of clarity. FIG. 1 shows a spot-type disc brake 1 with a friction lining warning device 2. Spot-type disc brake 1 comprises a caliper housing 3 which is guided on a pin 4. Pin 4 is firmly screwed into a brake carrier 5. At an external stem 6 of the housing 3, a brake lining 7 is arranged which presents a carrier plate 8 and a friction lining 9. An internal stem 10 is furnished with a cylinder 11 with a piston 12 which urges a brake lining 13 which comprises a carrier plate 14 and a friction lining 15 against a brake disc 16 upon actuation of the brake. The friction lining warning device 2 comprises a switch housing 17 which is stationarily positioned at the caliper housing 3 through a damping bushing 18. A stud 19 of the friction lining warning device 2 is stationarily positioned at the pin 4. A front surface 20 of the stud 19 is in abutment against a bottom surface 21 of the switch housing 17 when the brake linings 7, 13 are new and in slight contact with the brake disc 16.

FIG. 2 illustrates spot-type disc brake 1 with brake linings 7, 13 whose friction linings 9, 15 are worn out. The distance 22 between the front surface 20 and the bottom surface 21 corresponds to the degree of wear of the lining of the fist-side, external friction lining 9.

FIG. 3 illustrates the friction lining warning device 2 which interacts with the pin 4 and with the caliper housing 3 of the spot-type disc brake 1. At one end 20 facing away from the brake carrier, the pin 4 presents a hexagonal recess 24. At its stud end 25, the stud 19 is anchored, with a spring plate 26, in hexagonal recess 24. A projection 27 extending in radial direction and having annular shape is formed with an abutment surface 28 which butts against a front surface 29 of pin 4. The stud 19 projects with its cylindrical section 28' into the switch housing 17. The cylindrical surface 29' is spaced from an internal generated surface 31 of the switch housing 17 in radial direction by the space 30. At its transition 32 between the bottom surface 21 and the generated surface 31, the switch housing 17 is furnished with a depression 33, as a result of which the stud does not clamp at transition 32 and the stud 19 and the switch housing 17 may perform a relative motion in respect to each other. Switches 34, 35 and 36 are positioned at the internal generated surface 31 which release in the direction 37 when the stud 19 moves. In one version of the device of the present invention, it is assumed that the switch 34 releases when the stud 19 has travelled a distance 38 sized 4 mm. Accordingly, the switches 35, 36 release after the distances 39, 40, upon a travel of 8 mm and of 12 mm, respectively. In this way, a nearly continuous indication of any wear of the linings becomes possible. The switch housing 17 surrounds with its axially projecting section 41 the projection 27 and the pin end 23 and is screwed with an external thread 42 onto an internal thread 43 of a threaded insert 44. The threaded insert 44 is inserted with its end section 45 in the damping bushing 18. Damping bushing 18 surrounds the pin 4 in a shell type manner and is arranged between the pin 4 and the housing 3. A protective bushing 46 is provided with axially extending grooves (not shown) and with associated axially extending projections 47 which engage matching grooves 48 and projections 49 which are configured at a shell surface 50 of the switch housing 17. Simultaneously, the protective bushing 46 engages with its grooves and projections 47 projections 51 and grooves 52 of a matching configuration which are provided on the cylindrical external surface 53 of the threaded insert 43. The switch housing 17 is furnished with a hexagonal recess 54 with the aid of which the switch housing 17 is screwed onto the thread. A balance of tolerances between the damping bushing 18 and the switch housing 17 is adjusted. The adjustment is made by means of a fine thread 42, 43. For this purpose, the damping bushing 18 is transformed in such a manner that it comprises a rubber section 55 and a threaded insert section 44. The protecting cap 46 being configured in the shape of a safety bushing which is guided in grooves in the threaded insert section 44 and in the bushing 17 serves as a protective means against rotation, that is, as a safeguard for the basic adjustment.

Figure 4:
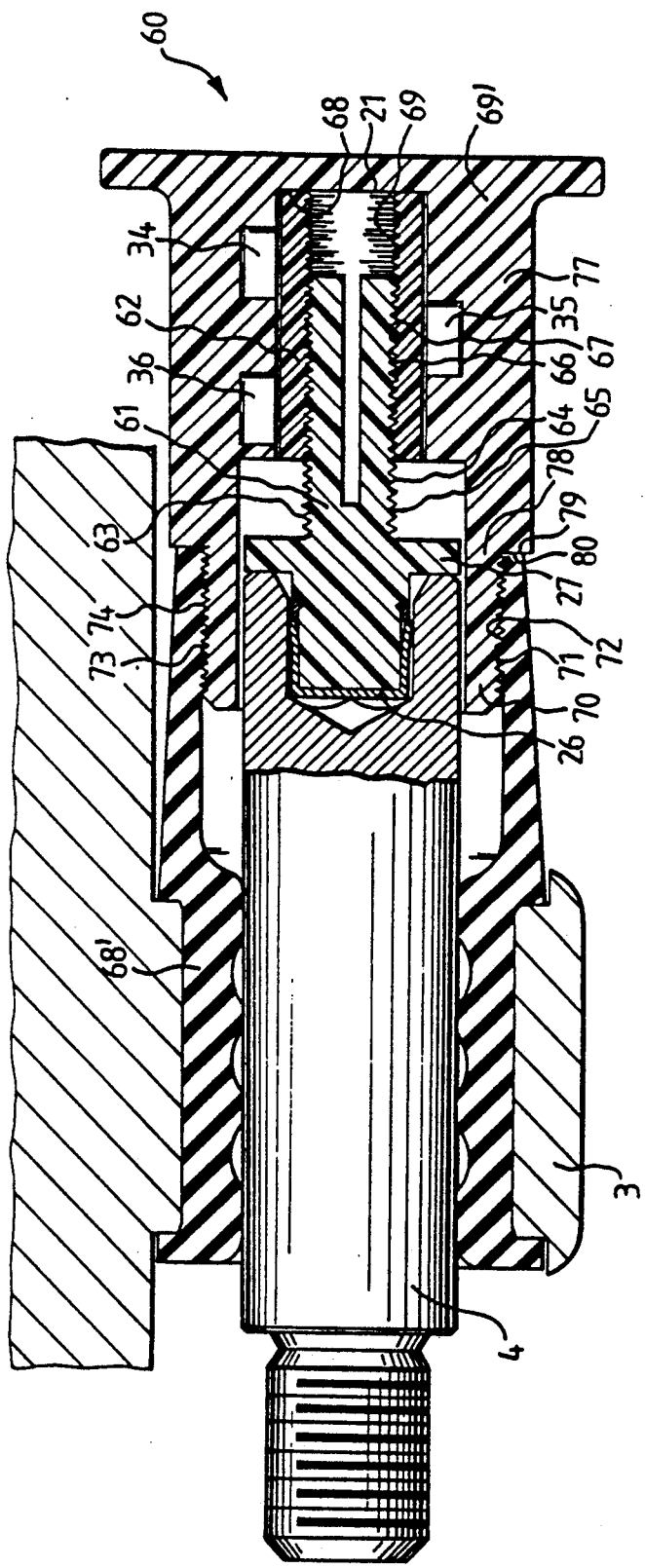
FIG. 4 shows a further friction lining warning device whose stud is of a two-part configuration.

FIG. 4 illustrates a second friction lining warning device 60 with a stud 61 onto which a bushing 62 is positioned. Stud 61 is provided with radially projecting projections 64 extending in a ring-shaped manner over its entire circumference and is configured at the surface 63, with grooves 65 arranged between them, which engage indentations 66 and projections 67 of the bushing 62 which present a matching configuration. An axially extending projection (similar to element 209 of FIG. 12) of the stud 61 engages a groove 69 of the busing 62 which has a matching configuration. Bushing 62 includes a front surface 68 which butts against the bottom surface of the switch housing 69'. In the range of the pin 4, switch housing 69' is furnished with an axially extending notch section 70 having radially extending projections 71 and associated grooves 72 around its circumference in a ring-shaped manner and which engage grooves and projections 73 and 74 of the damping bushing 68' which present a matching configuration. Radial projections and grooves 71 to 74 are interrupted by an axial groove, respectively by an axial projection being arranged at the switch housing 69', optionally at the damping bushing 68', engaging one another and representing a safeguard against rotation. The notch section 70 has a radially short configuration, so that another section 77 extends farther to the outside in radial direction, as a result of which a radially directed abutment surface 79 for a front surface 80 of the damping bushing 68' is formed at a transition 78. A balance of tolerances between the guide pin 4 and the switch housing 69' is carried out through the stud 61 and the bushing 62. By the notching of the stud 61 and the bushing 62 it is always possible to push the switch housing 69' up to the stop into the damping bushing 68.

Figure 5:
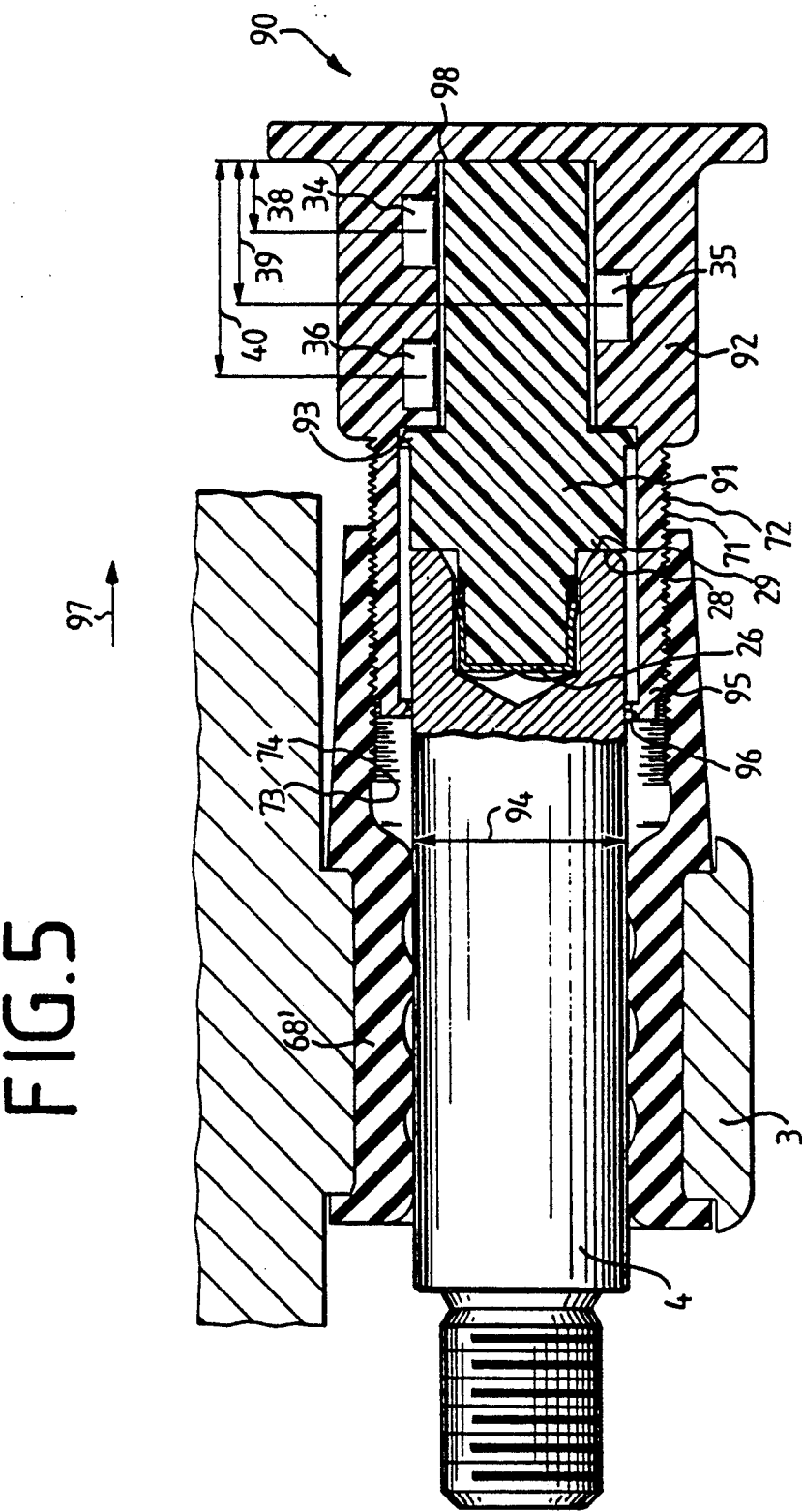
FIG. 5 shows a third friction lining warning device with radial noses which provide for unmounting of the entire friction lining warning device from the spot-type disc brake.

FIG. 5 illustrates a third friction lining warning device 90 with a stud 91 and a switch housing 92. The stud 91 is formed with a radially extending nose 93 running in ring-shaped manner entirely around its circumference which projects beyond the diameter 94 of the pin 4. At its open end 95, the switch housing 92 presents a radially internally extending nose 96 which catches behind the nose 93 of the stud 91.

In the following, the method of functioning of the friction lining warning device is described in greater detail: The wear of the brake lining is measured indirectly, utilizing, in the case of the fist caliper, the relative motion between the guide pin 4 and the housing 3. The wear monitoring device essentially comprises the switch housing 92, the stud 91, the spring plate 26, and the switches 34, 35, 36. The stud 91 is rigidly coupled, through the spring plate 26, to the guide pin 4 and, thus, is stationary. The switch housing 92 bears the switches 34, 35 and 36 and is coupled, through the damping bushing 68', to the housing 3 and, thus, moves, in the event of a wear of the linings, into the indicated direction of motion 97. Consequently, the distance of the switches 34, 35, 36 from a rear edge 98 of the stud 91 changes continuously. Now, the edge 98 can be utilized to trigger the switches, for example, mechanically, inductively, etc. The most varied switch points allow selection on the basis of the number of switches and their position in the bushing 92. The distances of travel 38, 39 and 40 correspond in this context to 4, 8 and 12 mm wear of the linings in the presence of which a warning will be given. Upon assembly, a basic adjustment and a balance of tolerance will be taken into account. When the linings are new the switch housing 92 is abutted against the stud 98 (basic adjustment). Then, the switches 34 to 36 will have a defined distance from the end of the stud 91, respectively from the edge 98 which corresponds to the degree of wear at which a warning is to be given. The distances of travel 38, 39 and 40 correspond to the wear of the linings and to a first, a second, and a third warning point. Since the distance between the damping bushing 68' and the guide pin 4 depends on the manufacturing tolerance, that tolerance is required to be balanced in order to arrive at the basic adjustment. In the friction lining warning device 90, this takes place through the notching 71 to 74 at the switch housing 92 and the damping bushing 68', in corresponding notch stages. Upon assembly, the wear monitoring device is pressed into the damping bushing 68' until the stud 91 is completely accommodated in the pin 4 (in abutment). At this moment, the surfaces 28 and 29 abut against each other. As a result of the impression, the bushing 92, too, will be in abutment against the stud 91, so that the basic adjustment will be ensured. A notching nose 93, respectively 96 is provided at the bushing 92 and at the stud 91 in order to ensure that the wear monitoring device 90 forms a unit and that the bushing 92 and the stud 91 do not become detached from each other. For the purpose of a change of the linings, the wear monitoring device is unmounted by extracting the switch housing 92. Due to the noses, the stud 91 also will be pulled out of the guide pin 4, so that the wear monitoring device 90 will remain one unit.

Figure 6:
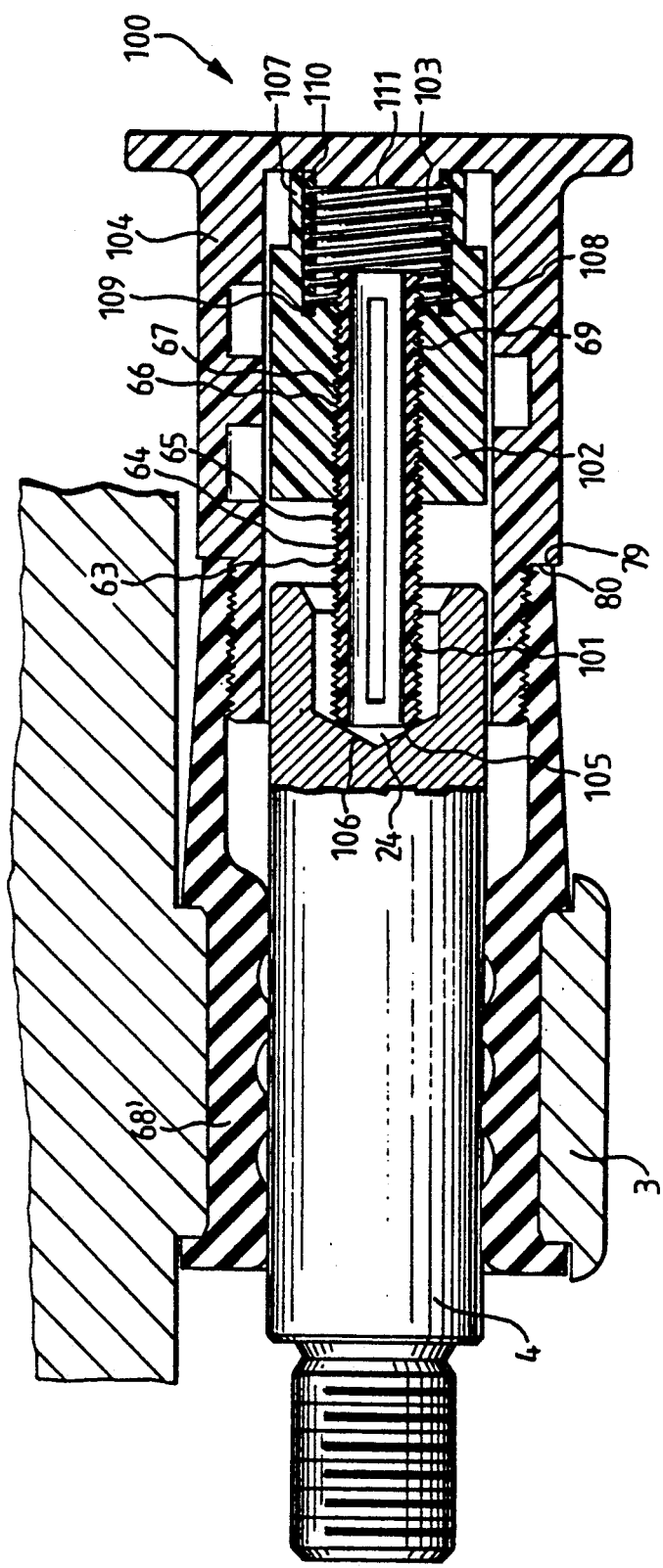
FIG. 6 shows a fourth friction lining warning device whose stud is retained at the pin by means of a spring.

FIG. 6 illustrates a friction lining warning device 100 with a stud 101 and a bushing 102. With the aid of a spring 103 which is positioned between the switch housing 104 and the bushing 102, the stud is urged with its front surface 105 against a bottom surface 106 of the hexagonal recess 24 and retained there. The stud 101 and the bushing 102 are secured in axial and in radial position through notches 63 to 66 and 68, 69. The bushing 102 presents a shell section 107 which surrounds the spring 103 in the shape of a hull. One spring end 108 is firmly clamped in a matching groove which is positioned in a ring shape around the circumference of the bushing 102. The opposite spring end 110 rests on a circular projection 111 of the switch housing 104.

The functioning will be explained in greater detail in the following: In this version, a fixation of the stud 101 within the guide pin 4 is not utilized The bushing 102 which is configured as a switching component is, instead, retained at the guide pin 4 by spring force through the probe stud 101. The balance of tolerances takes place in the same manner as in the friction lining warning device 60 in FIG. 4, between the stud 61 and the bushing 60 in FIG. 4, between the stud 61 and the bushing 62. The wear monitoring device 100 is mounted as one unit. For the purpose of the basic adjustment, the switch housing 104 is first pressed into the first notches of the damping bushing 68'. In this manner, the probe stud 101 will abut within the hexagonal recess of the guide pin 4. When the bushing 104 is urged in further, the spring 103 will then be compressed until the bushing 102 comes to be abutted against the bottom surface 21. This corresponds to the basic adjustment of the switch points. Subsequently, the switch housing 104 is urged into the damping bushing 68' until the surfaces 79 and 80 abut against each other. Since the bushing 102 and the switch housing 104 are already in abutment with each other, the balance of tolerances will now be effected through the notching 63 to 66 of the probe stud 101 and the bushing 102.

Figure 7:
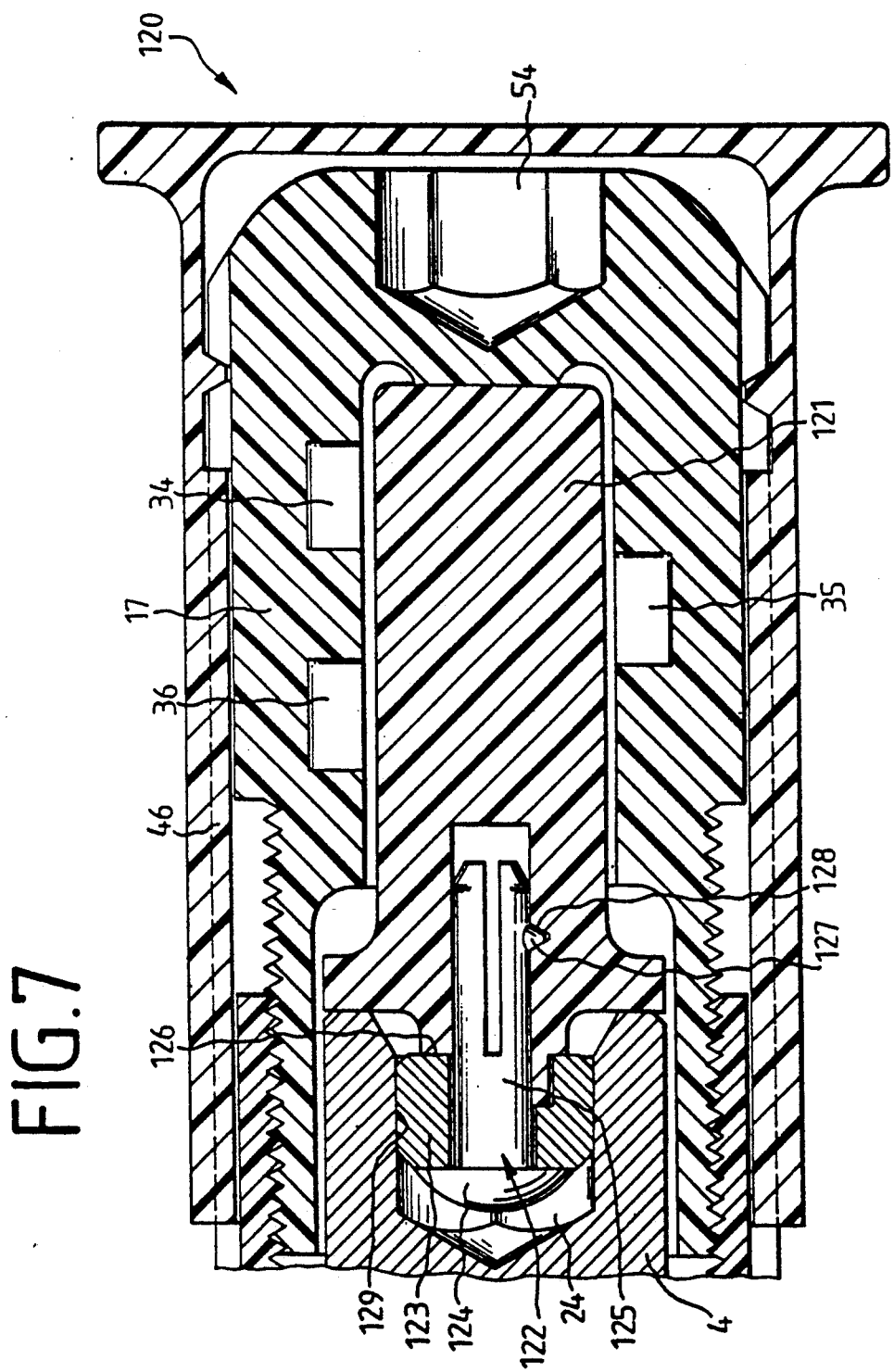
FIG. 7 shows a fifth friction lining warning device whose stud is retained at the pin by means of a shim.

FIG. 7 illustrates a friction lining warning device 120 with a stud 121 which is clampable within the hexagonal recess 24 of the guide pin 4 with the aid of a rivet 122 and a shim 123. The rivet 122 is comprised of a head 124 and a stem 125 which is guided by a bore of the shim 123. In this configuration, the head 124 keeps the shim 123 in abutment with the front surface 126 of the stud 121. With a nose 127 the stem 125 is inserted in a groove 128 of the stud 121 having a matching shape and is so retained in the stud. The shim 123 clamps with its cylindrical surface in the hexagonal recess 24.

Figure 8:
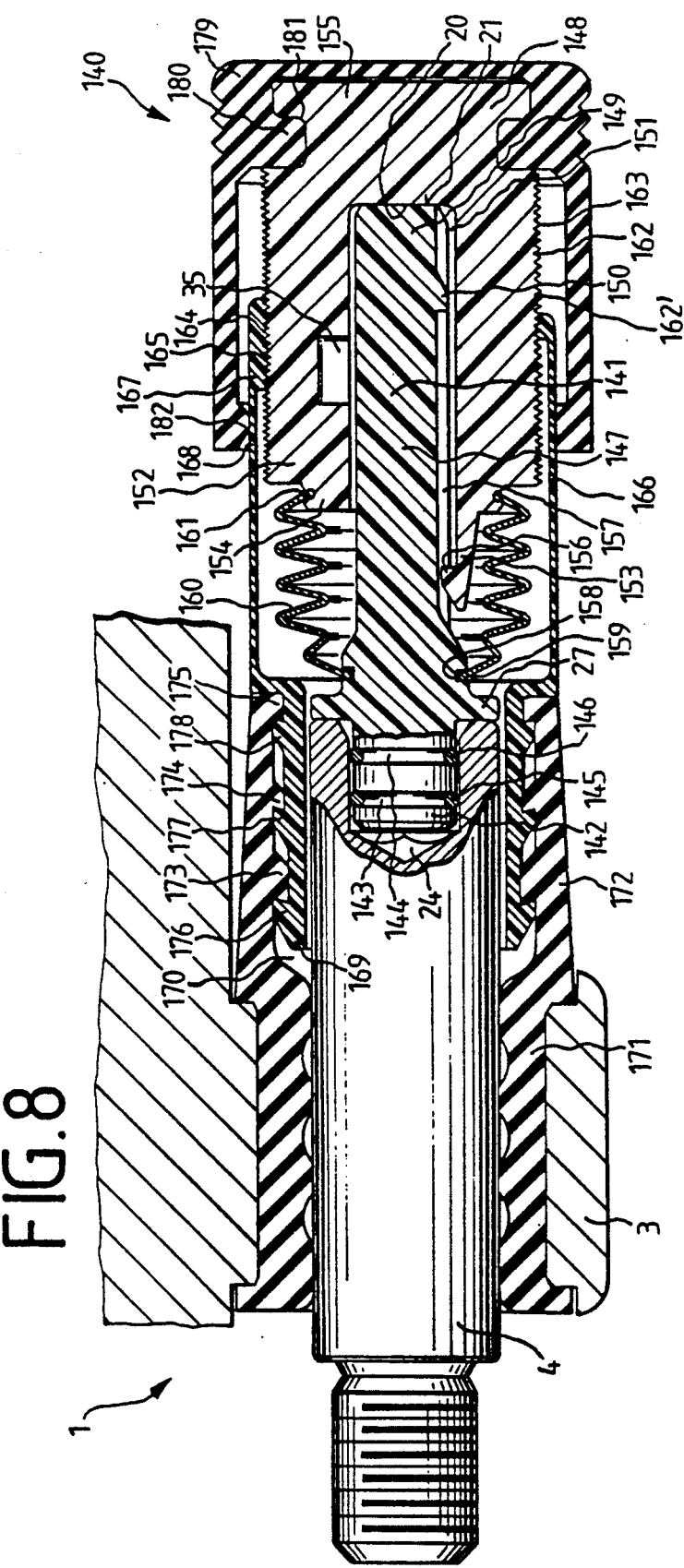
FIG. 8 shows a sixth friction lining warning device whose stud is retained at the pin by means of a locking ring.
Figure 10:
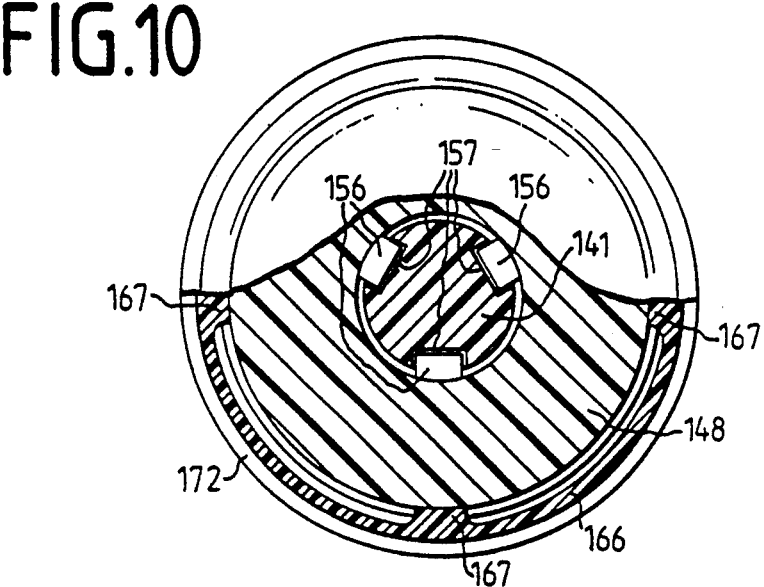
FIG. 10 shows a cross section through the sixth friction lining warning device of FIG. 8.

FIGS. 8 and 10 illustrate a friction lining warning device 140 with a stud 141. The stud 141 has an end section 142 with grooves 143, 144 in which retaining rings 145, 146 are inserted. The end section 142 projects into the hexagonal recess 24 of the pin 4 and keeps the stud 141 in abutment against the pin 4 with the aid of the retaining rings 145, 146. The stud 141 projects with its cylindrical section 147 into a switch housing 148 and abuts with its front surface 20 against the bottom surface 21 of the switch housing 148. At one end 149 of the cylindrical section 147, the stud is furnished with a nose 150 which slides in a groove 151 of the switch housing 148. The switch housing 148 surrounds with a shell section 152 the cylindrical section 147 of the stud 141 for about two thirds of its axial length. The stem section 152 extends in radial direction to accommodate the switches 34 to 36. At a projection 153 which extends in axial direction and which is arranged opposite a bottom section 155 at one stem end 154, a nose 156 is disposed which projects into a groove 157 of the stud 141, the groove 157 extending in axial direction and presenting a matching configuration. When the friction lining warning device 140 is removed from the spot-type disc brake 1 the noses 150 and 156 become hooked up behind each other and the stud 141 is extracted from the pin 4 jointly with the bushing 148. Adjacent to the projection 27 a groove 158 is configured which accommodates a protuberance 159 of a cup 160. The opposite end 161 of said cup 160 is retained in a radially extending circumferential groove in the stem end 154 of the switch housing 148. In this manner, the switches 34 to 56 which are incorporated in the switch housing 148 and which interact with the stud 141 are protected from soiling by means of the cup 160. At its cylindrical outer stem surface 162', the switch housing 148 is formed with radially extending circumferential grooves and projections 162 and 163 which engage grooves 164 and projections 165 of sensor housing 166 which present a matching configuration. In this context, two projections 165 are configured as ring-shaped circumferential projections and further projections 165 on axially directed webs 167. The sensor housing 166 essentially comprises a section 168 which surrounds the stud 141 and the switch housing 148 and of a section 169 which projects into an opening 170 of a damping bushing 171. In its section 172, the damping bushing 171 is furnished with radially inwardly extending ring-shaped, circumferential barbs 173, 174 and 175 which engage correspondingly shaped barbs 176, 177 and 178 of the sensor housing 166 which have a ring-shaped circumferential configuration and extend radially outwardly. With a radially inwardly extending ring-shaped projection 180, a protective bushing 179 projects into a correspondingly shaped groove 181 of the switch housing 148 and is, thus, fastened to the latter. The protective bushing 179 is provided with a stem section 181 whose radially inwardly projecting end rests on a cylindrical outer surface of the sensor housing 166 in the section 168.

Figure 9:
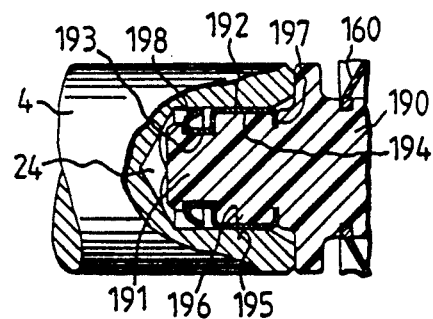
FIG. 9 shows a stud which is retained in the pin by means of an internal spring cup.

FIG. 9 illustrates a stud 190 which is fixed with its end 191 in the pin 4. For this purpose, the end 191 is provided with a spring plate 192 which becomes resiliently hooked up in the hexagonal recess 24 of the pin 4. The spring plate 192 surrounds the stud end 191 in the shape of a ring and has a substantially S-shaped cross-section with two bulges 193 and 194. With its external generated surface 195, the bulge 194 is abutted against the hexagonal recess and with its internal generated surface 196 against the stud end 191. One end 197 of the spring plate is clamped in a correspondingly shaped groove of the stud end 191. The bulge 193 is formed with a second end section 198 in the shape of a barb, so that although the stud 190 is easily introduced into the hexagonal recess 24, it will be more difficult to extract.

Figure 12:
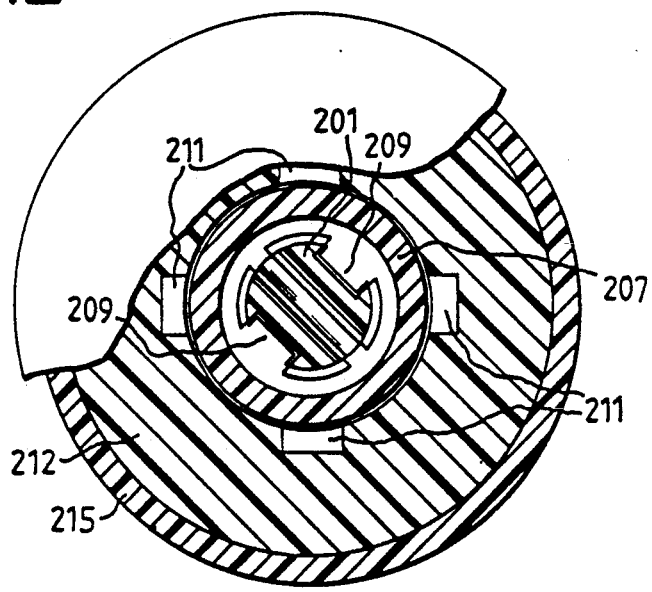

FIGS. 11 and 12 illustrate a friction lining warning device 200 with a stud 201 which is stationarily coupled to the pin 4. Said stud 201 is furnished with a stem 202 which engages through ring-shaped, radially extending projections 203 and grooves 204 associated projections 205 and grooves 206 of a bushing 207 which is disposed on the stud 201. The projections 203 and grooves 204 of the stud 201 are interrupted by an axial groove 208 within which slides a correspondingly configured nose 209 of the bushing 207. The bushing 207 is formed with another nose 210 which engages an associated groove 211 of a switch housing 212. With a cover surface 213, switch housing 212 abuts in axial direction against a front surface 214 of a sensor housing 215. Sensor housing 215 is furnished with a shell-shaped section 216 surrounding substantially the switch housing 212 and the stem section 202 of the stud 201 and with an internally disposed hook section 217 which projects into an opening 218 of a damping bushing 219 and which detachably engages, with radial projections 220 to 222, correspondingly configured grooves of the damping bushing 219. In a corresponding manner, hooks 226, 227 and 228 of the damping busing 219 engage associated grooves 229 to 231 of the sensor housing 215.

In the following, the functioning will be explained in greater detail: When the friction lining warning device 200 is introduced into the damping bushing 219 the bushing 207 will first rest on the external stem end 202, as a result the noses 209 and 232 contact each other and the nose 205 locks in a recess 236. In this assembly position, radially directed surfaces 247, 238 of the bushing 207 and of the stud 201 butt against each other. Subsequently, the friction lining warning device is moved in the direction 233 until the front surfaces 28 and 29 of the stud 201 and of the pin 4 butt against each other. The stud 201 is, thus, secured in the pin 4 by its end section 142 by the two retaining rings 145 and 146. The switch housing 212 and the sensor housing 215 will already be clamped to each other and the abutment surfaces 213 and 214 will butt against each other. Thereupon, the sensor housing 215 is inserted with its projections 220 in the damping bushing 219 to such an extent that the projections 220 to 222 become locked in the associated grooves 223 to 225. Consequently, the bushing 207 is moved at the same time over the bottom surface 21 and over the front surface 68 in the direction 233 across the notching projections 203 of the stud 201. For the purpose of disassembly, the switch housing 212 is moved in the direction 234 and entrains the bushing 207 through the noses 210 and 235 and simultaneously the stud 201 in the direction 234 through the nose 209 which becomes locked in the recess 236. Upon assembly, the stud 201 first will engage the hexagonal recess 24 before the nose 209 jumps out of its assembly position over the nose 232 in the recess 236 and before the tolerance is balanced by urging the monitoring device 200 in still further. During disassembly, the bushing 207 will first be restored into the above described assembly and disassembly position by the noses 210 and 235, before the stud 201 is extracted out of the hexagonal recess 24 by the abutment surfaces 237, 238. The sensor thereby will have resumed its correct position for reassembly.

What is claimed is:

1. A friction lining warning device for a pin-guided spot-type disc brake whose caliper housing is slidingly arranged at a pin, with a stud which engages an opening of said pin and is arranged in alignment with the latter, with a switch housing which surrounds said pin and which is connected to said caliper housing, said pin and said stud being movable relative to said switch housing and to said caliper housing, and with electric switches adjacent said stud in said switch housing which release when said stud has travelled a predetermined distance in respect to said switch housing, said switch housing and said stud in abutment with each other and providing a basic adjustment and said switch housing being connectable to said caliper housing within a range of tolerance after said basic adjustment has been provided, wherein said stud (19, 61, 91, 101, 102, 121, 141, 190, 201) presents a stop (29, 105) which is axially abuttable with said pin (4) and means for indicating that a warning state has been detected.

2. A friction lining warning device as claimed in claim 1, wherein a front surface (105) of said stud (101, 102) forms said stop (105).

3. A friction lining warning device as claimed in claim 1, wherein said stud (19, 61, 62, 91, 121, 141, 190, 201) is furnished with a ring-shaped circumferential projection (27) with a radially directed surface (29) which forms said stop (29).

4. A friction lining warning device as claimed in claim 3, wherein said stud (19, 61, 91, 101, 102, 121, 141, 190, 201) is furnished with a front surface (20, 68) against which said switch housing (17, 69', 92, 104, 148, 212) is abuttable with a bottom surface (21).

5. A friction lining warning device as claimed in claim 3, wherein said switch housing (17, 69', 92, 104, 148, 212) is arranged with a damping bushing (18, 44, 68', 171, 219) which surrounds said pin (4) in the shape of a shell and which is arranged in an opening of said caliper housing (3) between the said pin (4) and said caliper housing (3), respectively on said brake carrier (5).

6. A friction lining warning device as claimed in claim 5, wherein said switch housing (17) is provided with a thread (42) which is screwable onto a matching counterthread (43) of said damping bushing (18, 44).

7. A friction lining warning device as claimed in claim 6, wherein said damping bushing (18, 44) is two-part and is furnished with a threaded insert (44) with a thread (43).

8. A friction lining warning device as claimed in claim 7, wherein a protective bushing (46) is formed with axially directed projections (47) which engage axially directed grooves (48) of said threaded insert (44) and of said switch housing (17).

9. A friction lining warning device as claimed in claim 8, wherein said switch housing (69', 92, 104, 148) is furnished with projections (71, 163) which have a notch-shaped configuration and are arranged circumferentially in a ring-shaped manner.

10. A friction lining warning device as claimed in claim 9, wherein said damping bushing (68') is formed with grooves (73) which are arranged circumferentially in a ring-shaped manner and into which said projections (71) of said switch housing (69') are lockable.

11. A friction lining warning device as claimed in claim 1, wherein said switch housing (148, 212) is provided with a sensor housing (166, 215) with projections (176, 177, 178, 220, 221, 222).

12. A friction lining warning device as claimed in claim 1, wherein said stud (61, 201) is provided with a second bushing (62, 207).

13. A friction lining warning device as claimed in claim 12, wherein said second bushing (62, 207) is formed with projections (67, 205) and grooves (66, 206) of which are locked in grooves (65, 204) and projections (63, 203) of said stud (61, 201).

14. A friction lining warning device as claimed in claim 13, wherein said stud (61, 201) and said second bushing (62, 207) present an axial groove (69, 208) and an axial projection (209) which engage each other.

15. A friction lining warning device as claimed in claim 1, wherein at an open end (95, 154), said switch housing (92, 148, 212) is furnished with a radially inwardly directed nose (96, 156, 235) which catches behind a radially outwardly directed nose (93, 150, 210) of said stud (91, 141, 201, 207).

16. A friction lining warning device as claimed in claim 12, wherein said bushing (102) accommodates a spring (103) which takes support at said switch housing (104) and which keeps said stud (101, 102) in abutment with said pin (4).

17. A friction lining warning device as claimed in claim 1, wherein said stud (19, 61, 91, 190) is furnished with a spring plate (26, 192) which clamps said stud (19, 61, 91, 190) in said pin (4).

18. A friction lining warning device as claimed in claim 1, wherein said stud (141, 201) includes a retaining ring (145, 146) which clamps said stud (141, 201) in said pin (4).

19. A friction lining warning device as claimed in claim 1, wherein between said stud (141, 201) and said switch housing (148, 212), a cup (160) is arranged.

20. A friction lining warning device for a spot-type disc brake slidingly arranged on a pin, with an axially extending stud presenting a front surface and with a bushing surrounding said stud and presenting an internal bottom surface which are movable relative to each other, wherein said front surface (20, 68) of said stud (19, 61, 62, 91, 101, 102, 121, 141, 190, 201) is abuttable against said bottom surface (21) and means for indicating that a warning state has been detected including electric switches mounted in said bushing adjacent said stud, and wherein said stud provides a stop which is axially abuttable with said pin.

21. A friction lining warning device as claimed in claim 20, wherein the wear of the friction lining is continuously indicatable.

* * * * *